(12) United States Patent
Rookstool

(10) Patent No.: US 9,482,114 B2
(45) Date of Patent: Nov. 1, 2016

(54) COMPRESSOR CASE LINING

(76) Inventor: Craig Rookstool, Lee's Summit, MO (US)

( * ) Notice: Subject to any disclaimer, the term of this patent is extended or adjusted under 35 U.S.C. 154(b) by 978 days.

(21) Appl. No.: 13/698,066

(22) PCT Filed: May 31, 2011

(86) PCT No.: PCT/US2011/038574
§ 371 (c)(1),
(2), (4) Date: Nov. 15, 2012

(87) PCT Pub. No.: WO2011/153150
PCT Pub. Date: Dec. 8, 2011

(65) Prior Publication Data
US 2013/0064658 A1    Mar. 14, 2013

Related U.S. Application Data

(60) Provisional application No. 61/349,939, filed on May 31, 2010, provisional application No. 61/464,856, filed on Mar. 10, 2011.

(51) Int. Cl.
*F01D 25/24* (2006.01)
*C08G 59/68* (2006.01)
*C08L 63/00* (2006.01)
*F01D 11/12* (2006.01)

(52) U.S. Cl.
CPC .............. *F01D 25/24* (2013.01); *C08G 59/686* (2013.01); *C08L 63/00* (2013.01); *F01D 11/122* (2013.01); *Y02T 50/672* (2013.01)

(58) Field of Classification Search
CPC ........ C08K 7/04; C08K 7/06; C08G 59/686; F01D 11/122; F01D 25/24
USPC .................. 415/200; 523/461, 466, 468
See application file for complete search history.

(56) References Cited

U.S. PATENT DOCUMENTS

| | | | | |
|---|---|---|---|---|
| 3,346,175 A * | 10/1967 | Wiles | ..................... | C08G 59/22 415/136 |
| 4,208,777 A * | 6/1980 | Walsh | ................... | F01D 25/243 29/411 |
| 5,616,650 A * | 4/1997 | Becker | ................... | C08G 18/10 525/102 |
| 2007/0207186 A1 | 9/2007 | Scanlon et al. | | |
| 2007/0244268 A1* | 10/2007 | Usui | ..................... | C08G 59/18 525/524 |
| 2009/0004453 A1* | 1/2009 | Murai | .................. | B29C 43/003 428/299.1 |
| 2012/0270961 A1* | 10/2012 | Kotani | ..................... | C08F 2/48 522/18 |

FOREIGN PATENT DOCUMENTS

GB       2 327 466 A    1/1999

* cited by examiner

*Primary Examiner* — Woody Lee, Jr.
(74) *Attorney, Agent, or Firm* — McKee, Voorhees & Sease, PLC

(57) ABSTRACT

A lining for a compressor case in use with a gas turbine engine compressor is provided. The compressor includes a compressor casing, which is generally comprised of a first and second half. Inside the casing is a plurality of vanes attached to a plurality of vane bands. The vane bands are affixed to the interior of the compressor casing. A lining, comprising a carbon fiber reinforced-type material is applied to the interior of the compressor casing over the vane bands. The lining allows a minimal clearance to be between the lining and wheel blade tips spinning within the compressor casing. The carbon fiber in the lining allows the lining to withstand a high number of temperature cycles due to the use of the compressor and the gas turbine engine.

18 Claims, 7 Drawing Sheets

COMPRESSOR CASE LINING

CROSS-REFERENCE TO RELATED APPLICATIONS

This is a National Phase application claiming priority to PCT/US2011/038574 filed May 31, 2011 which claims priority under 35 U.S.C. §119 to provisional applications U.S. Ser. No. 61/349,939 filed May 31, 2010 and U.S. Ser. No. 61/464,856 filed Mar. 10, 2011, all of which are herein incorporated by reference in their entireties.

FIELD OF THE INVENTION

The present invention relates generally to gas turbine engine compressors, and more particularly to a new lining for an engine compressor case that can be added during repair and overhaul of the engine.

BACKGROUND OF THE INVENTION

A gas turbine engine extracts energy from a flow of hot gas produced by combustion of gas or fuel oil in a stream of compressed air. In its simplest form, a gas turbine engine has an air compressor (radial, axial, or centrifugal flow) fluidly coupled to a turbine with a combustion chamber disposed therebetween. Energy is released and work is performed when compressed air is mixed with fuel and ignited in the combustor, directed over the turbine's blades, spinning the turbine. Energy is extracted in the form of shaft power (e.g., turboshaft engines) and/or compressed air and thrust (e.g., turbojet/turbofan engines).

Compressors generally include a compressor wheel with a plurality of spaced apart blades or vanes on that wheel. The compressor wheel is rotated about an axis within the engine housing to receive air from an inlet, accelerate and compress that air, and then discharge the air through an outlet. To be most efficient, the air is generally forced to flow between the space defined by the blades, the rotational hub of the compressor wheel and a portion of the engine housing commonly referred to as a compressor case. The case also includes blades or vanes in staggered orientation to the wheel vanes to further compress the air.

Compressor efficiency is often greatest when a minimal running clearance is maintained between the case and the tips of the wheel blades or vanes to prevent leakage of the air around the tip of the blades. However, during normal operation of the compressor, centrifugal forces acting on the compressor wheel cause it to "grow" radially in the direction of the case. Thus, establishing minimum running clearance at operational speeds of the compressor can be a complex task given the variables involved. An error in case position could result in a significant loss of operating efficiency or cause damage to the compressor when the blades bind against the case. For instance, the blades may fracture and be consumed by the engine, causing engine failure. Blades or vanes coming into contact with the compressor case may also cause sparks that could cause the entire engine to ignite, creating an explosion.

Therefore, the addition of a lining or coating has been included within compressor cases. The coating is a thin layer, usually a plastic and resin mixture, that minimizes clearance between the coating and the tips of the wheel vanes. Additionally, the coating or lining is made to be abradable, which allows the vanes to extend into the coating if they expand due to the centrifugal forces, or other reasons. The spinning vanes can contact the lining without the possibility of the vanes being damaged, or of sparks or ignition occurring.

However, problems exist with the compressor case plastic lining. For instance, many of the gas turbine engines are used with aircraft, such as airplanes and helicopters. In use, the engines may cycle between extreme low and high temperatures from start-up to shutdown. The number of cycles is important, as many repairs and/or inspections are required at engine or device specific cycle levels. As the number of cycles, and thus, the use of the device increases, there is a greater chance for things to fail. Because of the composition of the plastic liners currently used in compressor cases, the higher the number of thermal cycles causes the lining to become damaged. The cycling of extreme high and low temperatures can produce cracks in the plastic lining. If the lining is not repaired or replaced during one of the inspections, pieces of the lining could become detached and strike the vanes or other engine components, creating damage. The damage to the compressor vanes would decrease the efficiency of the engine. If the damage is great enough, it could cause the engine to fail.

Therefore, at appropriate time and cycle levels, the compressor case lining is inspected for cracks. If they exist beyond acceptable limits, the cracked lining must be removed, and the compressor case repaired and overhauled with a new lining for safe use in an engine. However, the cost of replacing a compressor case with a repaired and overhauled case is high. Having liners that crack at lower time and cycle levels make owning and operating aircraft incorporating the compressors expensive.

Therefore, there is a need in the art for an improved compressor case lining for use with a gas turbine engine that creates a minimal running clearance, but that is also abradable. There is also a need for an improved compressor case lining that has a longer cycle life than plastic liners.

It is therefore a primary object, feature, and/or advantage of the present invention to overcome or improve on deficiencies in the art.

It is another object, feature, and/or advantage of the present invention to provide an improved compressor case lining that is stronger than the prior art.

It is another object, feature, and/or advantage of the present invention to provide an improved compressor case lining that last more cycles.

It is another object, feature, and/or advantage of the present invention to provide a compressor case that is repaired and overhauled with a new lining.

It is yet another object, feature, and/or advantage of the present invention to provide a compressor case lining using a carbon fiber mixture.

It is still a further object, feature, and/or advantage of the present invention to provide a compressor case lining that is abradable and will not damage compressor vanes.

It is yet another object, feature, and/or advantage of the present invention to provide an improved compressor case lining including multiple layers for both strength and to meet industry standards.

These and/or other objects, features, and advantages of the present invention will be apparent to those skilled in the art. The present invention is not to be limited to or by these objects, features and advantages. No single embodiment need provide each and every object, feature, or advantage.

SUMMARY OF THE INVENTION

According to one aspect of the present invention, a compressor for use in a gas turbine engine is provided. The compressor includes a compressor casing, a plurality of vanes, and a lining. The plurality of vanes are positioned radially about the interior of the compressor casing. The lining is at the interior of the compressor casing, and comprises a mixture including carbon fiber, a resin, a curing agent, a graphite filler, a silicon dioxide filler, and a diethylaminoethanol catalyst.

According to another aspect of the present invention, a mixture for use as a lining for a compressor casing of an engine is provided. The mixture comprises a resin, a carbon fiber filler, a hardener, a graphite filler, a silicon dioxide filler, and a diethylaminoethanol catalyst.

According to still another aspect of the present invention, a compressor for use in a gas turbine engine is provided. The compressor includes a compressor casing having a generally cylindrical shape, a plurality of vane bands, and a liner. The plurality of vane bands are positioned adjacent the interior of the compressor casing, and include a plurality of vanes extending inwardly from the bands and positioned radially about the interior of the compressor casing. The liner is positioned adjacent the plurality of vane bands and comprises a mixture including carbon fiber, a resin, a curing agent, a graphite filler, a silicon dioxide filler, and a diethylaminoethanol catalyst. The liner includes a first layer of carbon fiber and resin mixture directly adjacent the plurality of vane bands and a second layer of smooth epoxy resin mixture outside the layer of carbon fiber and resin mixture. The plurality of vanes extend from the plurality of vane bands and inwardly through the liner towards the center of the compressor casing.

DETAILED DESCRIPTION OF THE PREFERRED EMBODIMENTS

Gas turbine engines are described thermodynamically by the idealized Brayton cycle, in which air is compressed isentropically, combustion occurs at constant pressure, and expansion over the turbine occurs isentropically back to the starting pressure. In practice, friction and turbulence cause non-isentropic compression. Specifically, the compressor tends to deliver compressed air at a temperature that is higher than ideal. Further, pressure losses in the air intake, combustor and exhaust reduce the expansion available to provide useful work. By some estimates, up to half of the power produced by the engine goes to powering the compressor.

Figure 1:
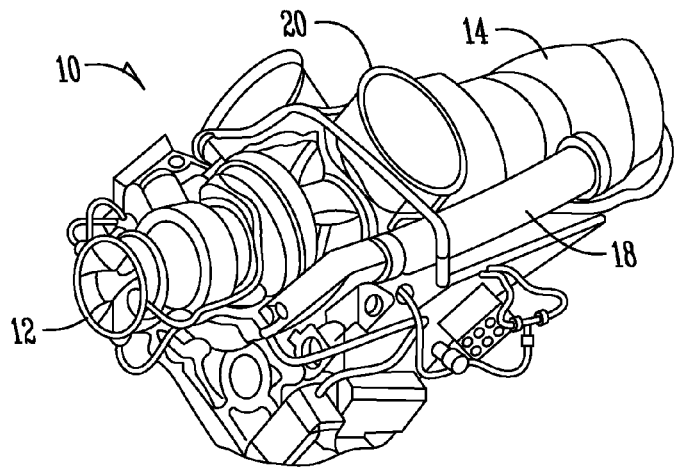
FIG. 1 is a perspective view of a gas turbine engine.
Figure 2:
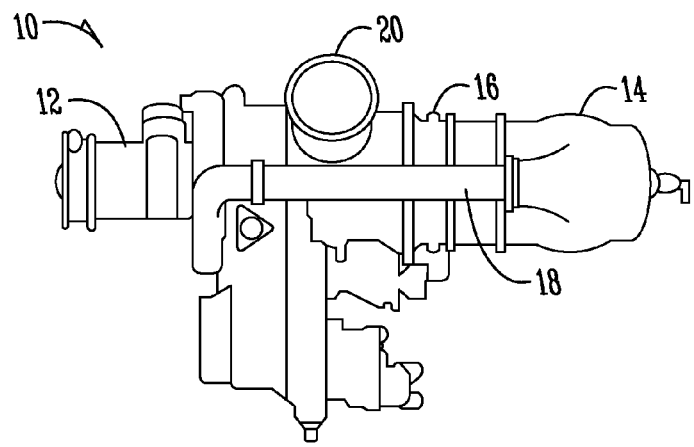
FIG. 2 is a side view of the gas turbine engine of FIG. 1.
Figure 3:
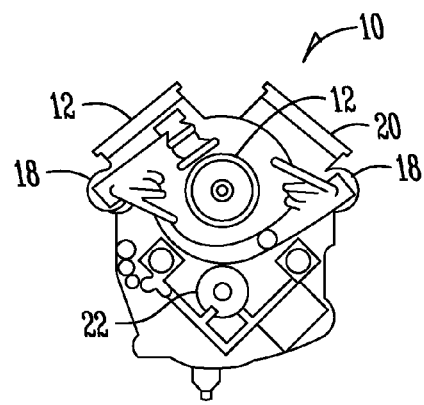
FIG. 3 is an end view of the gas turbine engine of FIG. 1.

FIGS. 1-3 show a gas turbine engine 10 in the perspective, side, and front views. The configuration of the engine 10 is such that air enters the intake of the compressor 12 in a conventional fashion, but whereby compressed air leaving the compressor 12 is ducted rearwards around the turbine system via external air ducts 18. That is, unlike most other turboshaft engines, the compressor 12, combustion chamber or combustor 14 and turbine section 16 are not provided in an inline configuration with the compressor at the front and the turbine at the rear where compressed air flows axially through the engine. Rather, in the engine 10 shown, the engine air from the forward compressor 12 is channeled through the external compressed air ducts 18 on each side of the engine 10 to the combustor 14 located at the rear of the engine. The exhaust gases from the combustor 14 then pass into a turbine stage 16 located intermediate the combustor 14 and the compressor 12. The exhaust gases are exhausted mid-engine in a radial direction from the turbine axis A-A of the engine, through two exhaust ducts 20. A power take-off shaft 22 connects the power turbine of the turbine stage to a compact reduction gearbox (not shown) located inboard between the compressor and the exhaust/power turbine system.

Figure 4:
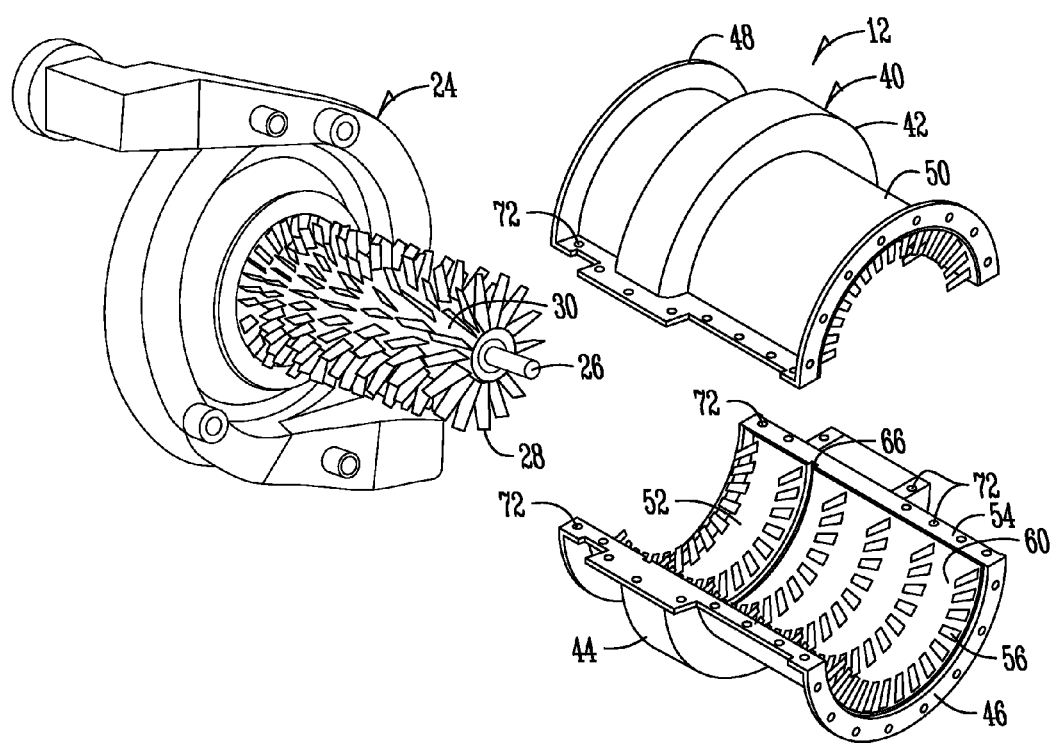
FIG. 4 is an exploded view of a compressor used with a gas turbine engine.

FIG. 4 illustrates an exploded view of the compressor 12 section of the engine 10. Generally, the compressor 12 includes a compressor casing 40. Extending into the compressor casing is a rotor structure 24. The rotor structure 24 may include a rotating shaft 26 that extends through the engine 10 to the turbine 16. The rotating shaft 26 includes multiple rotor vane bands 30 spaced along the length of the rotating shaft 26, each of which include a series or set of wheel blades 28 extending away from the rotating shaft 26. The compressor 12 includes a compressor casing 40 of any appropriate shape (e.g., annular shape) having inside and outside surfaces 54, 50, inlet and outlet ends 46, 48, and a central axis 70 running through the center of the compressor casing 40. However, the figures show the compressor case 40 to be generally a cylinder shape. As shown, the compressor casing 40 may be divided into first and second halves 42, 44. A plurality of vane bands 58 are disposed on the inside surface 54, each of which include a plurality of vanes or blades 56.

In assembly, the first and second halves 42, 44 of the compressor casing 40 are connected to one another at connecting holes 72. The halves are mirror images of one another, such that each has a series of corresponding holes. The halves 42, 44 may be connected by bolts, pins, or other securing fashion. In this manner, the casing 40 surrounds the shaft 26 and wheel blades 28 extending therefrom. It should be noted that the longitudinal axis 70 of the compressor casing 40 is in line with the longitudinal axis (not shown) of the shaft 26. In this configuration, the wheel blades 28 and the vanes 56 in the compressor casing 40 are alternated or staggered such that the wheel blades 28 are rotatable in the spaces between the vane bands 58 of vanes 56. While the angles and lengths of the various wheel blades 28 and compressor case vanes 56 generally vary, it is appreciated that they are set by industry standards.

When the wheel blades 28 move relative to the vanes 56, air advances from the inlet end 46 of the compressor casing 40 through the multiple rows of compressor and wheel blades 28, 56, and discharges through the compressor outlet end 48. As the air advances through the compressor 12, the air may be compressed from ambient pressure to over 100 psi. However, the compression pressure may vary between different engines.

To increase the efficiency of the compressor 12, the wheel blades 28 should extend from the rotor shaft 26 a distance such that little to no air may pass between the end of the rotor wheel blade 28 (the tip) and the interior wall 54 of the compressor casing 40. However, as the compressor casing 40 and the wheel blades 28 may both comprise a metal, such as steel, the wheel blades 28 may expand due to centrifugal force and heat. The extended or expanded wheel blades 28 may then come in contact with the interior wall 54 of the compressor casing 40. However, the contact between the wheel blade 28 and the compressor casing 40 could cause sparks and/or damage to the casing. For instance, the force of the wheel blades 28 striking the casing 40 may cause a vane to break off and be sucked through the engine 10. Having a foreign object flying through an engine 10, including high spinning components, can create a greatly increased chance of damage and potential shut down of the engine. Therefore, a lining 60 is applied to the interior 52 at the interior wall 54 of the casing 40. The lining 60 should be applied after the vane bands 58 have been attached to the interior wall 54 of the casing 40. This will be described in greater detail below.

Figure 5:
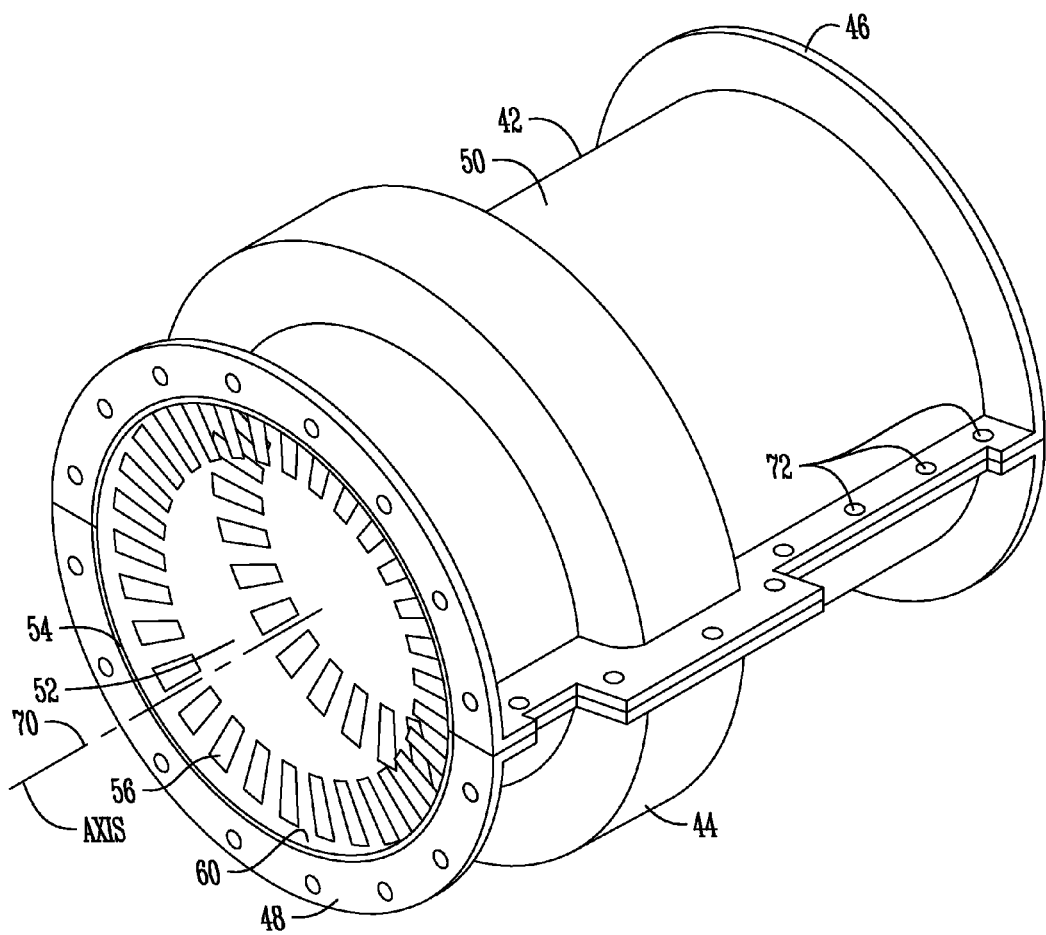
FIG. 5 is a perspective view of a compressor casing according to the present invention.

FIG. 5 is a perspective view of the compressor casing of the present invention. As shown in FIG. 5, the compressor casing may be formed of two halves 42, 44. The two halves are mirrored images of one another, and are attached to each other. The halves 42, 44 may be attached at a plurality of holes 72 by a screw and nut. However, the halves may also be attached to one another by other means, such as by adhesive, rivets, welding, or any other way known in the art. Also shown in FIG. 5 is the lining 60. As shown, the lining 60 is a thin layer about the circumferential surface area of the interior 52 of the compressor casing 40. Additionally, the plurality of vanes 56 are shown to extend through the lining 60 and towards the longitudinal axis 70 of the casing 40.

Figure 6:
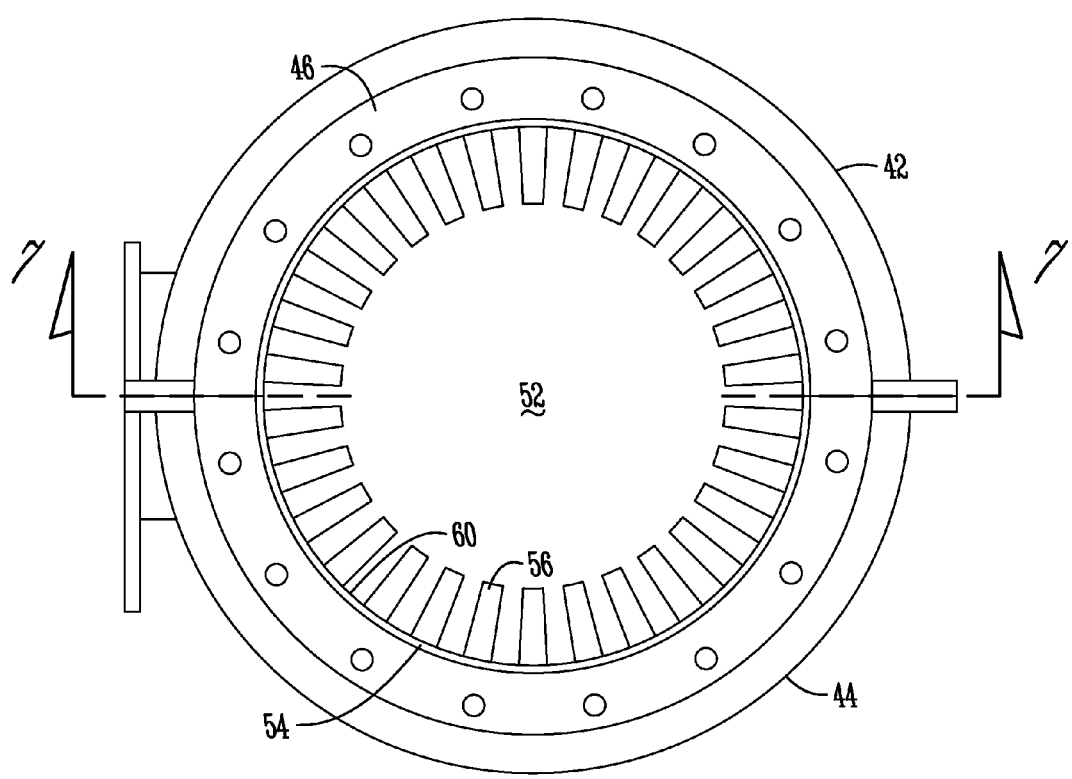
FIG. 6 is an end view of the compressor casing of FIG. 5.

FIG. 6 is an end view of the compressor casing 40 of FIG. 5. FIG. 6 shows that the vanes 56 are radially spaced around the interior wall 54 of the casing 40. The figure also shows that the lining 60 is evenly distributed about the casing 40.

Figure 7:
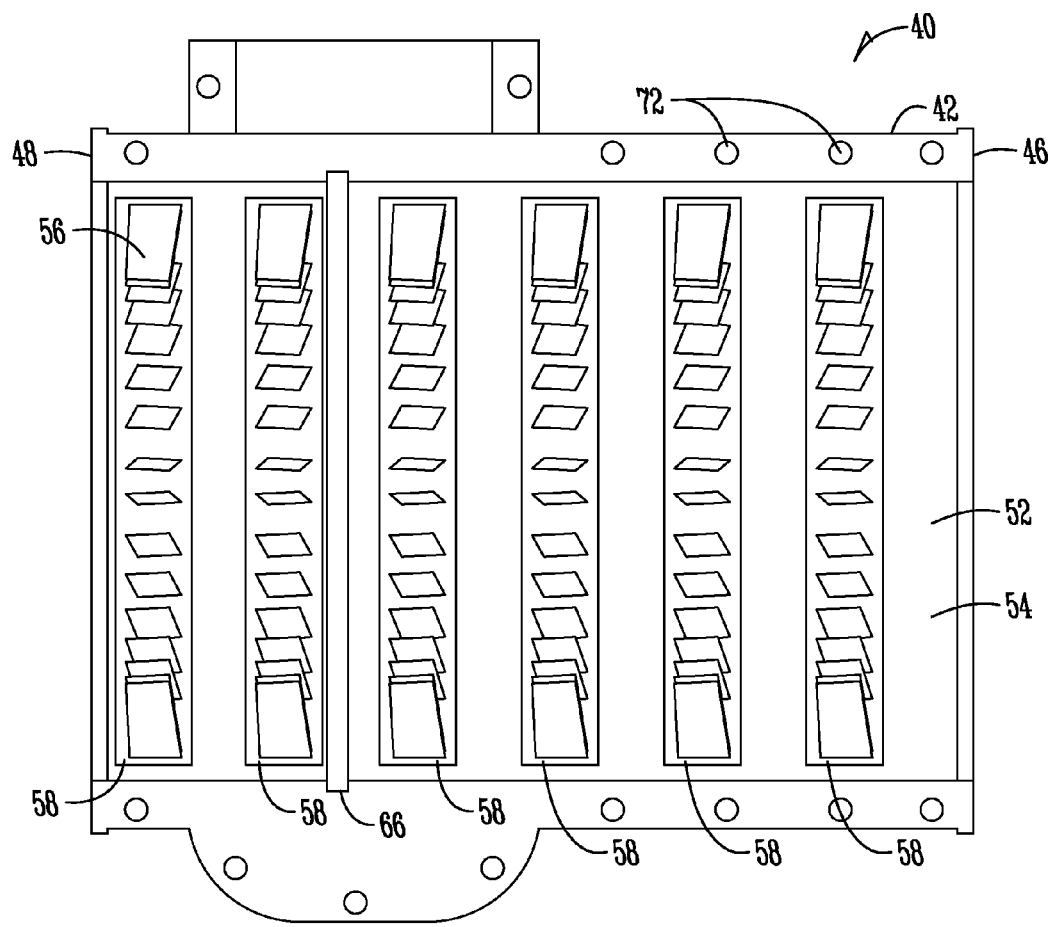
FIG. 7 is a side view of one half of a compressor casing before a lining has been applied.

FIG. 7 is a side view of one half 42 of the compressor casing 40 before the lining 60 has been applied to the interior 52 of the casing. The figure shows that the plurality of vanes 56 are attached to vane bands 58. The vane bands 58 comprise a rigid material, such as steel or a composite material. The vanes 56, also a rigid material such as steel, titanium, or composite material, are affixed to the vane bands 58 by welding, adhesives, or other attaching means. The location of the bands 58 at the interior wall 54 of the compressor casing 40 is determined by industry and/or government standards. Therefore, it should be appreciated that the present invention contemplates that number of bands 58 and vanes 56 may vary according to the standards, and that the invention is not to be limited to the exact location and number of bands shown in FIG. 7.

Figure 8:
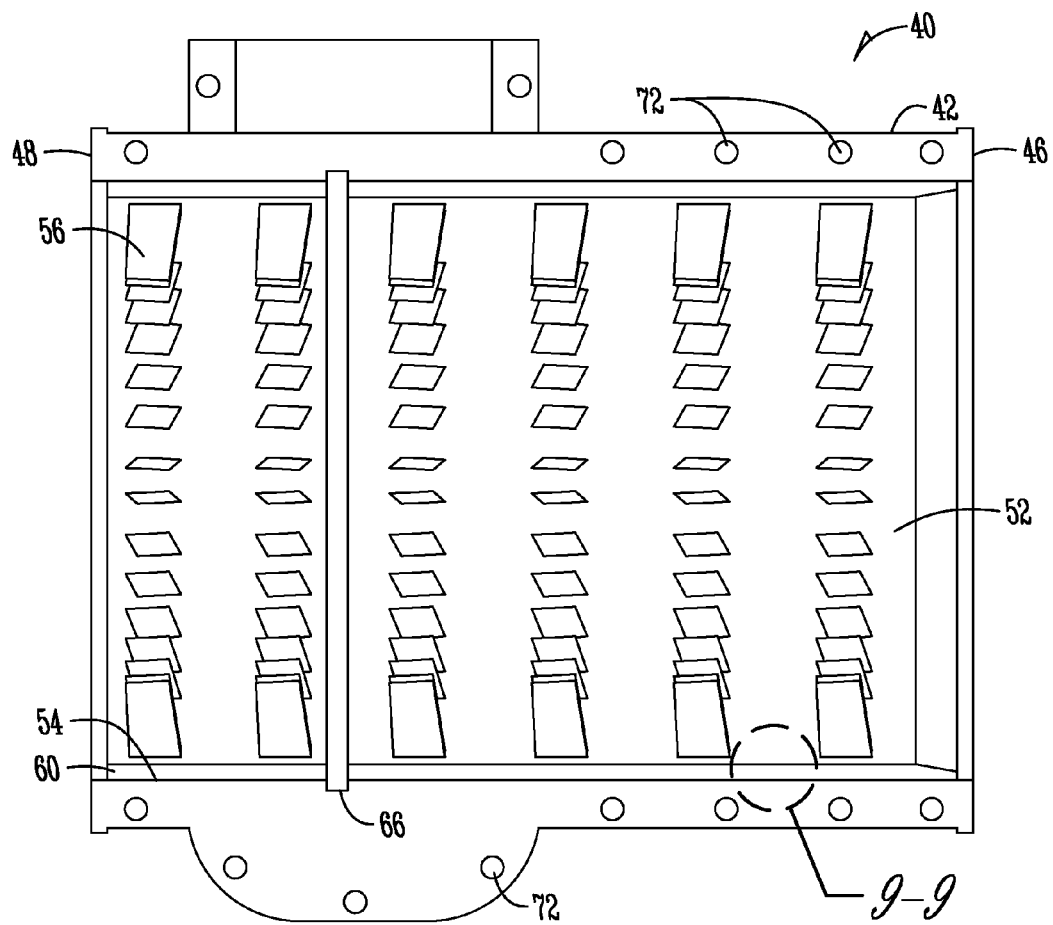
FIG. 8 is a side view of one half of a compressor casing according to the present invention after the lining has been applied.

FIG. 8 is a side view of one half 42 of the compressor casing 40 after the lining 60 has been applied. The figures show the location of the lining 60. As shown, the lining 60 will form a smooth coating on the interior of the casing 40. The thickness of the lining 60 is such that the amount of space between the edge of the wheel blade 28 and the lining 60 is minimal, or even negligible. This provides for the greatest efficiency in compressing the air in the compressor 12. However, the lining 60 should also be abradable such that if the wheel blades 28 extend while spinning, the lining 60 allows the vane to rub and wear into the lining 60 without damaging either the compressor casing 40 or the wheel blades 28. In addition, the lining 60 must comprise a mixture capable of undergoing the temperature cycles experienced by the engine 10. For instance, in some circumstances the engine 10 will undergo temperature cycles from ambient temperatures up to 400° F. The engine 10 may undergo many of these temperature cycles. Therefore, the lining 60 must comprise a material capable of withstanding the temperature cycle and having a life to withstand multiple temperature cycles without cracking or otherwise becoming damaged.

The lining 60 of the present invention is a mixture comprising a resin, a carbon fiber filler, a hardener, a graphite filler, a silicon dioxide filler, and a diethylaminoethanol catalyst. The resin may be an epoxy resin, such as a semi-solid epoxy resin. The hardener may be an epoxy resin curing agent. The carbon fiber filler of the present invention comprises a discontinuous random-oriented carbon fiber reinforced type material. This is known as a carbon fiber and matrix or discontinuous random oriented carbon fiber reinforced polymer. The carbon fiber reinforced polymer is a very strong and light composite material that is sometimes referred to as a composite. The carbon fiber reinforced polymer is much stronger than talc-based polymers or other plastics. Therefore, the carbon fiber polymer will be able to withstand a greater number of temperature cycles for use in an engine 10, such as a gas turbine engine.

The lining 60 of the present invention may be used in the repair and overhaul (R&O) of a gas turbine engine 10. As most gas turbine engines include compressors 12 with compressor casings 40 having a talc or plastic based liner, the liner or lining will crack or deform after a relatively low number of temperature cycles. Therefore, the lining of the compressor casings 40 must be replaced. To repair and overhaul the lining 60 of a compressor casing 40 the original or cracked lining must first be removed from the casings. The removal is accomplished by heating the casings to a predetermined temperature to allow the liner to be burnt out of the interior of the casings. The inside of the casings are then power sprayed to remove all of the old lining. After the damaged lining has been fully removed from the interior of the first and second halves 42, 44 of the compressor casing 40, the plurality of vane bands 58 that contain the plurality of vanes 56 and the plurality of vanes 56 themselves must be carefully inspected to determine any damage to them. If either any of the plurality of vanes 56 or plurality of vane bands 58 are damaged, they must be removed from the interior wall 54 of the casing 40 and replaced with an undamaged version. As shown in FIG. 7, a vane band 58 contains a plurality of vanes 56 and is affixed to the curvature of the interior wall 54 of the casing 40. The strip may be affixed by welding the strip to the wall, by an adhesive between the strip and the wall, by screw or rivet between the wall and strip, or any other means for affixing the band 58 to the interior wall 50 of the casing 40. It should be noted, however, that the exact location of vane bands 58, number of vanes 56, length of vanes 56, and angle of the vanes 56 are determined by an industry and/or government standard. Therefore, the exact number, length, and/or angle of the plurality of vanes 56 in the interior 52 of the casing 40 is not defined by the present application, and instead should be determined by the appropriate industry or government standard.

Once the casing 40 and vanes 56 have been inspected, and repaired if necessary, a new coating of lining 60 is applied to the compressor casing 40. The mixture of composition of the lining 60 as described above is mixed together.

The lining mixture is an epoxy and resin seal compound with the following components. The semi-solid epoxy resin is included in a parts by weight (PBW) of 200. The carbon fiber is included at a ratio of 60 PBW. The hardener is included at a ratio of 76 PBW. The graphite filler is included at a ratio of 25 PBW. The silicon dioxide is included at a ratio of 5 PBW, and the diethylaminoethanol catalyst is included at a ratio of 2.9 PBW. A high temperature red silicone is inserted in the groove 66 of the compressor casing 40 to ensure that the groove 66 is not filled during the application of the lining 60. The carbon fiber, graphite, and silicon dioxide are premixed and heated to 180-200° F. The resin is also heated to 180-200° F. The hardener is preheated to 120° F. and shall not be heated longer than 24 hours. The carbon fiber, graphite, and silicon dioxide mixture is mixed with the preheated resin mix thoroughly. Next, the preheated hardener and the diethylaminoethanol catalyst is mixed to the carbon fiber-resin mixture and blended thoroughly. The mixture is then ready to be injected or spun cast into the interior of the compressor casing 40.

The first half and second half 42, 44 of the compressor casing 40 should be affixed to one another and placed on a spinning mechanism (not shown). In addition, a thin coat of mold release should be applied to the split lines of the compressor casing 40 around the bolt holes 72. A steel shim stock (not shown) is placed between the horizontal split lines of the two halves of the compressor casing 40 before casing on the spinning mechanism. This allows the two halves of the compressor casing to be easily split once the lining has cured. Once the casing 40 is spinning at a speed of 500 rpm, the case should also be heated to a temperature range of 190-210° F. A nozzle (not shown) is inserted through either the inlet end 46 or the outlet end 48 of the compressor casing 40. The nozzle includes apertures spaced to be between the rows of the plurality of vanes 56 in the compressor casing 40. A predetermined amount of carbon fiber resin mixture is injected through the nozzle into the interior 52 of the compressor casing 40. The compressor casing with the carbon fiber-resin mixture is continued to spin for a predetermined amount of time and at a predetermined heat.

The spinning of the compressor casing 40 including the carbon fiber-resin mixture creates centrifugal forces that act on the mixture and spread the composition evenly throughout the interior of the compressor casing. When the compressor casing 40 is removed from the spinning mechanism, what is left is a smooth-finished interior lining 60, which is covering the vane bands 58, but which through the vanes 56 extend. However, to fully cure the lining, the casing with the lining should be heated for a set period of time.

Figure 9:
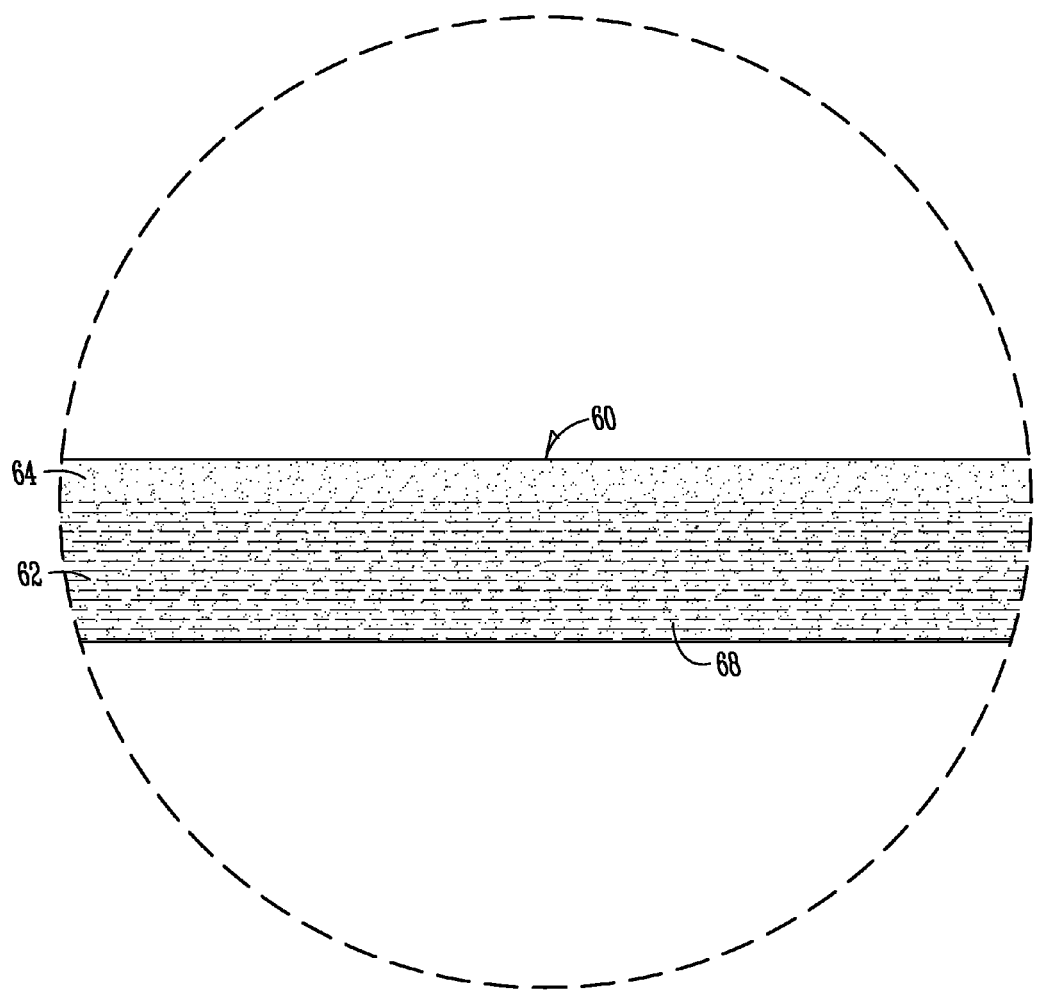
FIG. 9 is an enlarged view of a portion of one half of the compressor casing showing the lining of the casing.

FIG. 8 shows one half of the compressor casing 40 after the new lining 60 has been applied to the interior 52 of the compressor casing 40. In addition, FIG. 9 shows an enlarged section of a portion of one half of the compressor casing 40 showing the lining 60 in more detail. As shown in FIG. 9, the lining 60 comprises first and second layers 62, 64. The first layer 62 of the lining 60 is the inside layer closest to the interior wall 54 of the compressor casing 40. The first layer 62 comprises carbon fiber with some resin mixed in. The second layer 64, which is on the outside of the first layer 62, generally comprises just a resin composition. The two distinct layers are formed because of the following. The carbon fiber strands 68 are heavier solids than the other components of the composition for the lining 60. Therefore, as the composition is injected and spun cast into the compressor casing 40, the centrifugal forces will force the heavier material further away from the central axis 70 of the compressor casing 40. However, the amount of the mixture in the compressor casing 40 will still be such that the second layer 64 of resin will be on the outside of the first layer 62. The separate first and second layers 62, 64 is beneficial to the lining 60 as the inner first layer 62 will provide greater strength to the lining such that cracking or deformation will not occur even in high numbers of cycles. In addition, the second layer 64 comprising a mostly resin composition will allow the second layer 64 of the lining to still be abradable as necessary for use of the compressor 12 in the engine 10.

Once an inspection of the new lining 60 and the plurality of vanes 56 extending through the lining has been completed, the first and second halves 42, 44 of the compressor casing 40 are attached to one another. The compressor casing 40 has thus been repaired and overhauled, and is ready to be used with a gas turbine engine 10.

Other alternative variations obvious to those in the field of the art are considered to be included in this invention. For example, the size, shape, and material used for the compressor casing 40 may be varied. In addition, the number, length, and angle of the vanes 56 within the compressor casing 40 may also be varied. Furthermore, the end result of two layers is not required. For instance, the present invention contemplates having only one layer of lining 60. The one layer would be a carbon fiber mixture, similar to the first layer 62 of FIG. 9. Therefore, only one layer would comprise a mixture of carbon fiber 68 and epoxy resin that would have a higher strength and longer life than current talc-based epoxy resins. The description is merely an example of an embodiment and the limitations of the invention are not limited to the application.

What is claimed is:

1. A compressor for use in a gas turbine engine, comprising:
   a compressor casing 40;
   a plurality of vanes 56 positioned radially about the interior 52 of the compressor casing 40;
   a lining 60 at the interior 52 of the compressor casing 40, the lining 60 comprising a mixture including carbon fiber, a resin, a curing agent, a graphite filler, a silicon dioxide filler, and a diethylaminoethanol catayst,
   wherein the lining 60 includes a first layer 62 of the mixture containing the carbon fiber on the inside of the lining; and
   wherein the lining 60 includes a second layer 64 of the mixture containing no carbon fiber on the outside of the lining.

2. The compressor of claim 1 further comprising a groove 66 circumferentially about the interior 52 of the compressor casing 40.

3. The compressor of claim 1 wherein the carbon fiber comprises a discontinuous random-oriented carbon-fiber-reinforced type material.

4. The compressor of claim 1 wherein the lining 60 is a carbon fiber reinforced polymer.

5. The compressor of claim 1 wherein the plurality of vanes 56 extend inwardly from the compressor casing 40.

6. The compressor of claim 5 wherein the plurality of vanes 56 extend through the lining 60.

7. The compressor of claim 1 wherein the compressor casing 40 comprises a first 42 and second 44 compressor casing half.

8. The compressor of claim 1 wherein the plurality of vanes 56 are affixed to at least one vane band 58.

9. The compressor of claim 8 wherein the at least one vane band 58 is affixed at the interior 52 of the compressor casing 40.

10. A mixture for use as a lining for a compressor casing of an engine, comprising:
    a resin;
    a carbon fiber filler;
    a hardener;
    a graphite filler;
    a silicon dioxide filler; and
    a diethylaminoethanol catalyst;

wherein said mixture is used to line said compressor casing of an engine; and wherein said lining comprises a first layer comprising the carbon fiber filler and a second layer comprising no carbon fiber filler.

11. The mixture of claim 10 wherein the resin is a semi-solid epoxy resin.

12. The mixture of claim 10 wherein the carbon fiber filler comprises discontinuous random-oriented carbon-fiber-reinforced type material.

13. The mixture of claim 10 wherein the hardener is an epoxy resin curing agent.

14. A compressor for use in a gas turbine engine, comprising:

a compressor casing 40, the compressor casing 40 having a generally cylindrical shape;

a plurality of vane bands 58 positioned adjacent the interior 52 of the compressor casing 40, the plurality of vane bands 58 including a plurality of vanes 56 extending inwardly from the bands 58 and positioned radially about the interior 52 of the compressor casing 40; and a lining 60 positioned adjacent the plurality of vane bands 58, the lining 60 comprising a mixture including carbon fiber, a resin, a curing agent, a graphite filler, a silicon dioxide filler, and a diethylaminoethanol catalyst;

the lining 60 including a first layer 62 of carbon fiber and resin mixture directly adjacent the plurality of vane bands 58 and a second layer 64 of smooth epoxy resin mixture outside the layer of carbon fiber and resin mixture;

the plurality of vanes 56 extending from the plurality of vane bands 58 and inwardly through the lining 60 towards the center of the compressor casing 40.

15. The compressor of claim 14 wherein the compressor casing 40 comprises a first 42 and second 44 compressor casing half.

16. The compressor of claim 15 wherein the first 42 and second 44 compressor casing halves are mirror images of one another.

17. The compressor of claim 16 wherein the first 42 and second 44 compressor casing halves include a plurality of holes 72 for attaching to one another.

18. The compressor of claim 14 wherein the compressor casing 40 further includes an inlet end 46 and an outlet end 48.

* * * * *